(12) United States Patent
Stumpe et al.

(10) Patent No.: US 9,055,717 B2
(45) Date of Patent: Jun. 16, 2015

(54) GRAIN VACUUM ATTACHMENT FOR UNLOADING GRAIN BAGS

(75) Inventors: Leroy B. Stumpe, Hartford, SD (US); Scott L. Schmidt, Sioux Falls, SD (US)

(73) Assignee: Sioux Steel Company, Sioux Falls, SD (US)

( * ) Notice: Subject to any disclaimer, the term of this patent is extended or adjusted under 35 U.S.C. 154(b) by 723 days.

(21) Appl. No.: 13/248,193

(22) Filed: Sep. 29, 2011

(65) Prior Publication Data

US 2013/0031739 A1  Feb. 7, 2013

Related U.S. Application Data

(60) Provisional application No. 61/513,890, filed on Aug. 1, 2011.

(51) Int. Cl.
*E01H 1/08* (2006.01)
*A01F 25/20* (2006.01)

(52) U.S. Cl.
CPC ...................... *A01F 25/20* (2013.01)

(58) Field of Classification Search
USPC .............. 15/246.2, 340.1; 414/296, 307, 403, 414/411
See application file for complete search history.

(56) References Cited

U.S. PATENT DOCUMENTS

| | | | | |
|---|---|---|---|---|
| 5,419,102 A | * | 5/1995 | Inman et al. | 53/567 |
| 7,802,956 B2 | * | 9/2010 | Schertz et al. | 414/403 |
| 2009/0041566 A1 | * | 2/2009 | Lambertini | 414/526 |
| 2009/0263223 A1 | * | 10/2009 | Twiestmeyer et al. | 414/584 |
| 2011/0206488 A1 | * | 8/2011 | Windsor et al. | 414/462 |
| 2011/0290621 A1 | * | 12/2011 | Bodie et al. | 198/674 |
| 2012/0189413 A1 | * | 7/2012 | Richiger | 414/310 |

* cited by examiner

*Primary Examiner* — Lee D Wilson
*Assistant Examiner* — Shantese McDonald
(74) *Attorney, Agent, or Firm* — Jeffrey A. Proehl; Woods, Fuller, Shultz & Smith, P.C.

(57) ABSTRACT

An attachment is disclosed for vacuuming particulate material from a storage bag having a perimeter wall with an opening. The attachment may comprise a mobile base for moving across a ground surface and having a front and a rear. The attachment may comprise an intake assembly positioned toward a rear of the mobile base and may include a gathering conveyor configured to move material in a laterally inward direction toward a center of the intake assembly. The attachment may comprise a vacuum conduction assembly configured to conduct a vacuum condition from an outlet opening to an inlet opening positioned adjacent to the center of the intake assembly.

19 Claims, 20 Drawing Sheets

GRAIN VACUUM ATTACHMENT FOR UNLOADING GRAIN BAGS

REFERENCE TO RELATED APPLICATIONS

This application claims the benefit of U.S. provisional patent application No. 61/513,890, filed Aug. 1, 2011, which is hereby incorporated by reference in its entirety.

BACKGROUND

1. Field

The present disclosure relates to vacuum attachments and more particularly pertains to a new grain vacuum attachment for facilitating the use of a grain vacuum to unload a grain storage bag.

2. Description of the Prior Art

Grain vacuums have been utilized to clear relatively small quantities of grain from the floors of grain bins, and generally include a hose that terminates in an intake end on a wand that is typically manipulated by the user to bring it into proximity to the grain in the bin. The grain vacuum is highly suitable for removing grain in relatively small quantities from bins with relatively rigid floor and walls that resist being sucked into the intake end of the hose because of the concentrated suction at the inlet end. While attempts have been made to utilize the grain vacuum with grain storage bags, the flexible perimeter wall of the bag makes effective use of the vacuum wand difficult.

SUMMARY

In view of the foregoing, the present disclosure describes a new grain vacuum attachment for unloading grain bags which may be utilized for unloading a grain storage bag using a grain vacuum.

The present disclosure relates to an attachment for vacuuming particulate material from a storage bag having a perimeter wall with an opening. The attachment may comprise a mobile base for moving across a ground surface and having a front and a rear. The attachment may comprise an intake assembly positioned toward a rear of the mobile base and may include a gathering conveyor configured to move material in a laterally inward direction toward a center of the intake assembly. The attachment may comprise a vacuum conduction assembly configured to conduct a vacuum condition from an outlet opening to an inlet opening positioned adjacent to the center of the intake assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and particulars of the steps set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
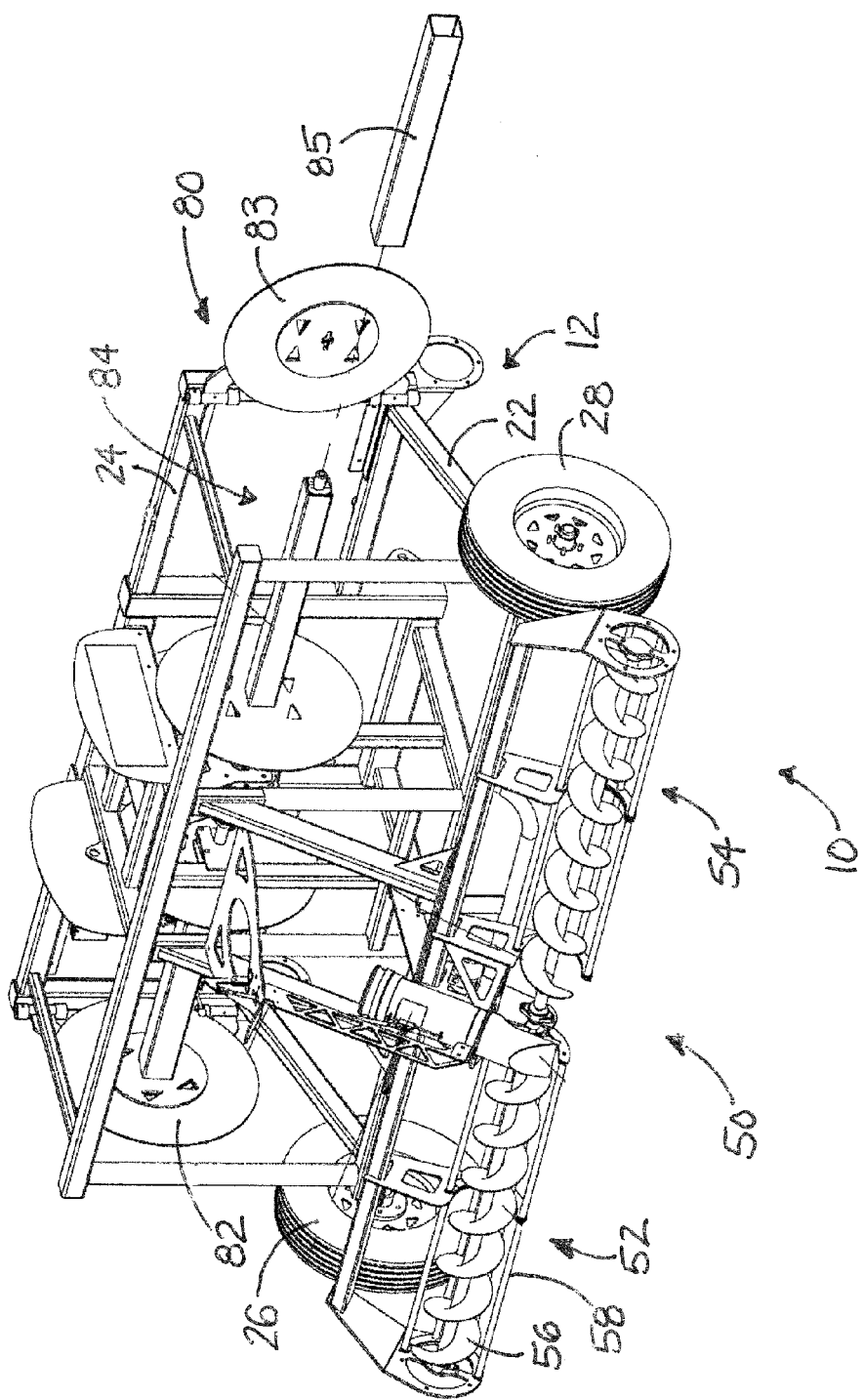
FIG. 1 is a schematic perspective view of a new grain vacuum attachment for unloading grain bags according to the present disclosure.
Figure 2:
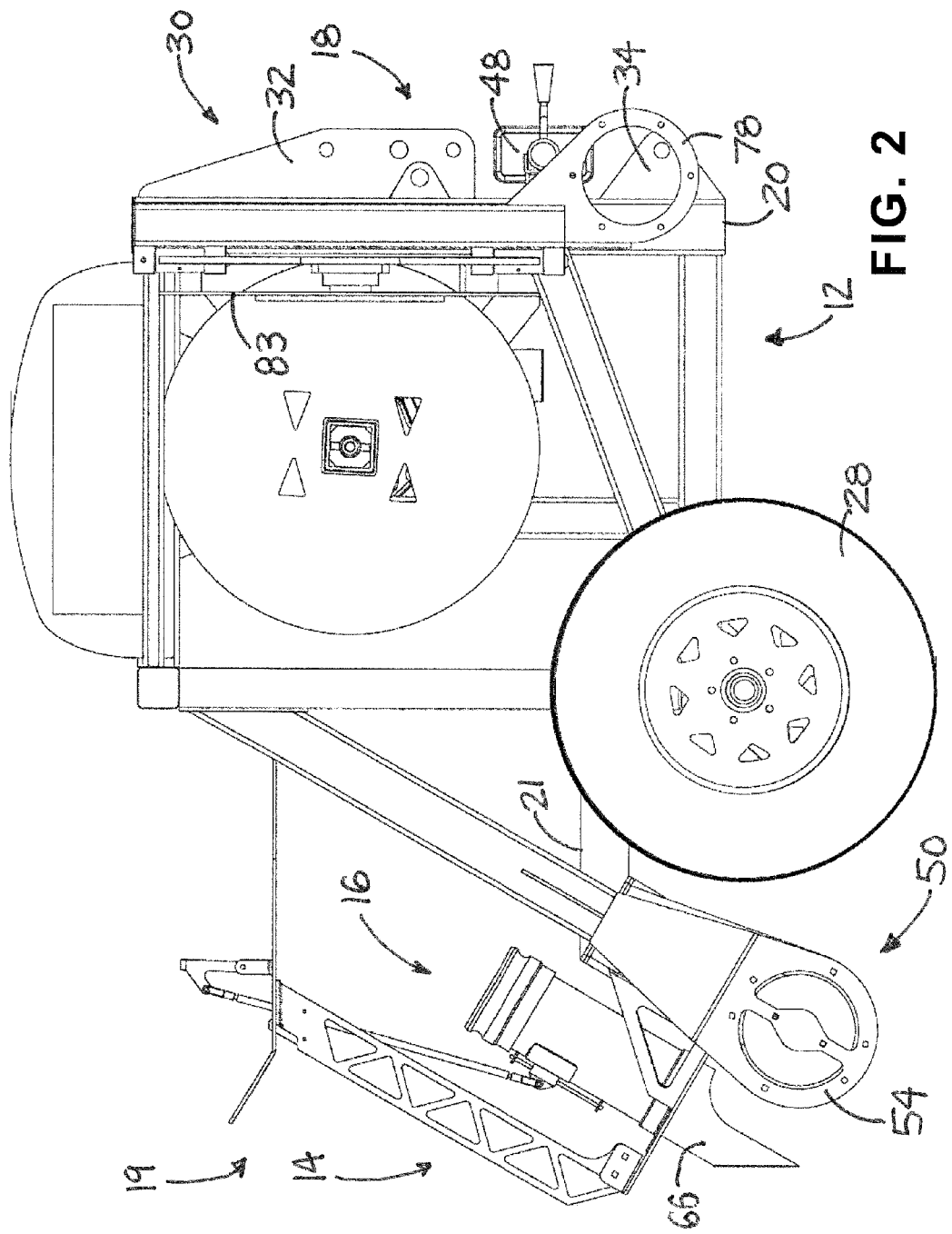
FIG. 2 is a schematic side view of the apparatus, according to an illustrative embodiment.
Figure 3:
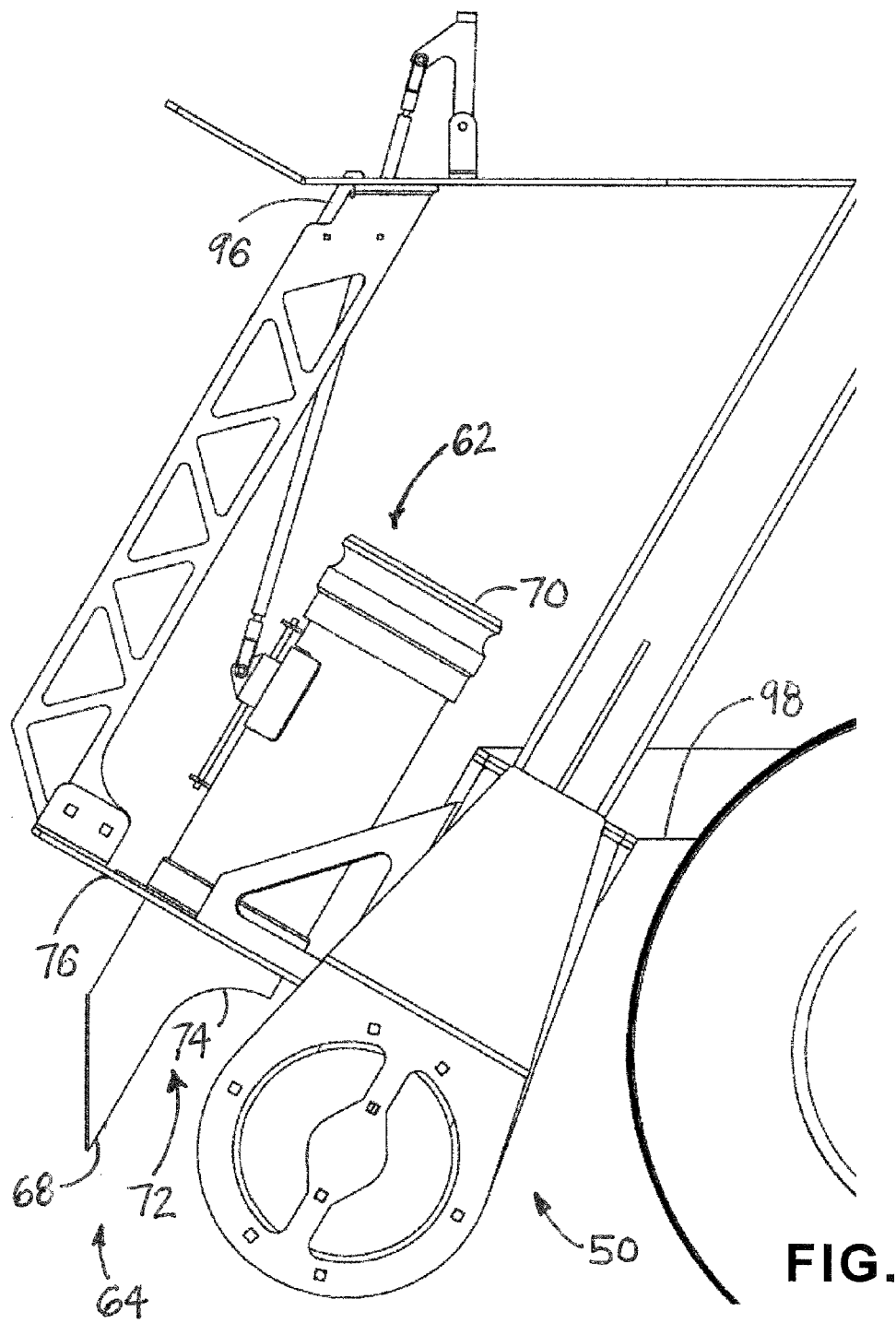
FIG. 3 is a schematic side view of the gathering assembly of the apparatus, according to an illustrative embodiment.
Figure 4:
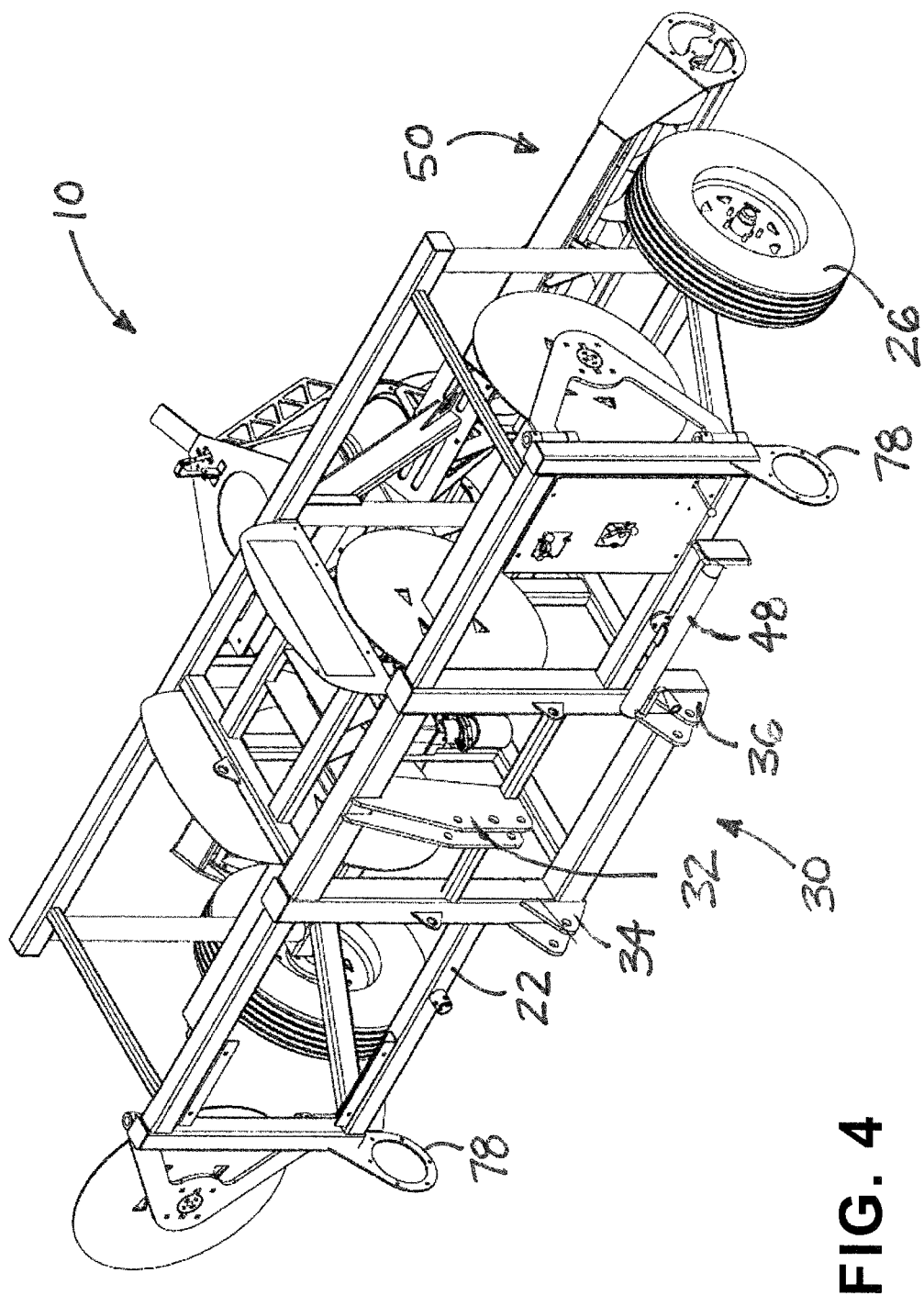
FIG. 4 is a schematic rear view of the apparatus, according to an illustrative embodiment.
Figure 5:
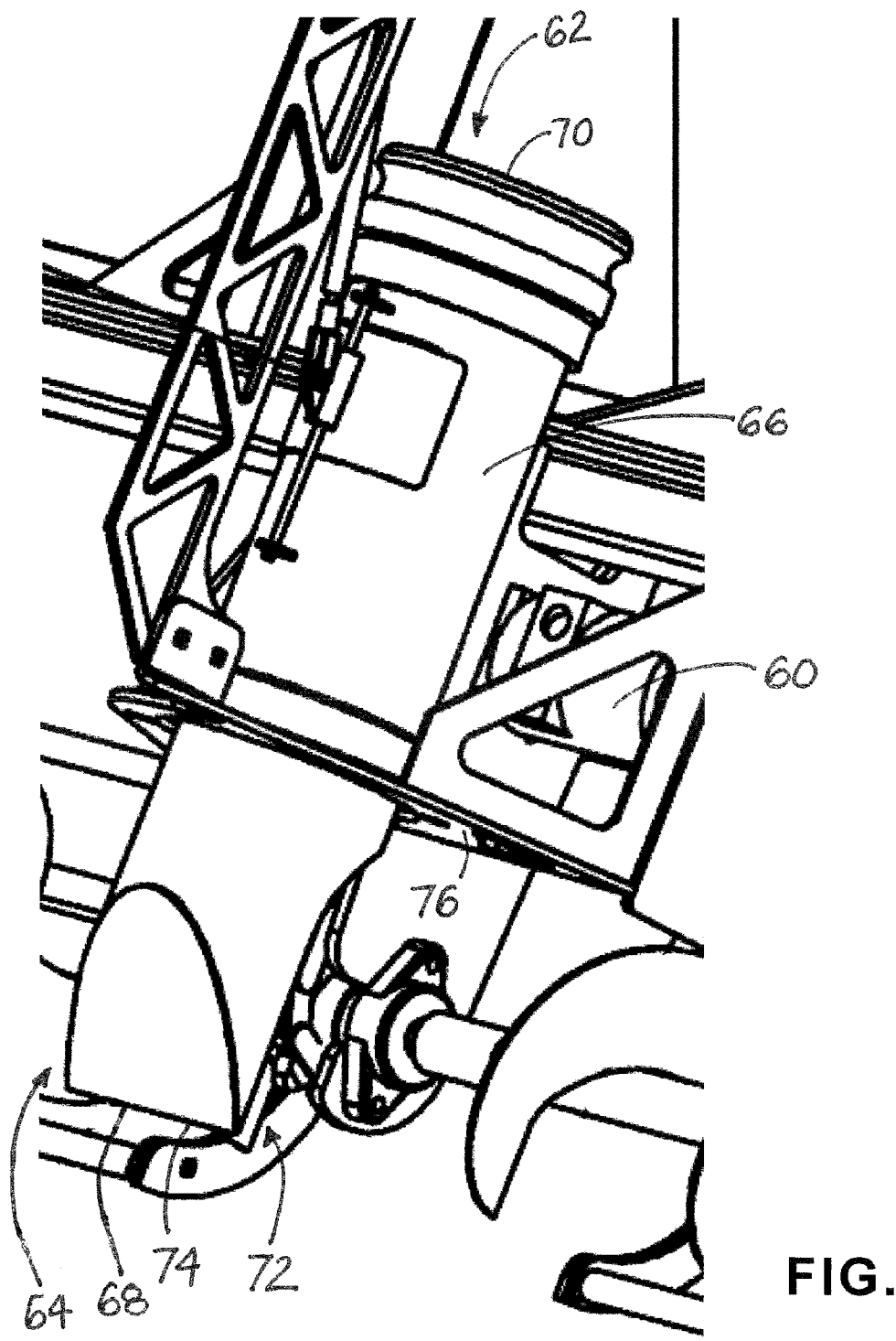
FIG. 5 is a schematic perspective view of a portion of the vacuum conduction assembly, according to an illustrative embodiment.
Figure 6:
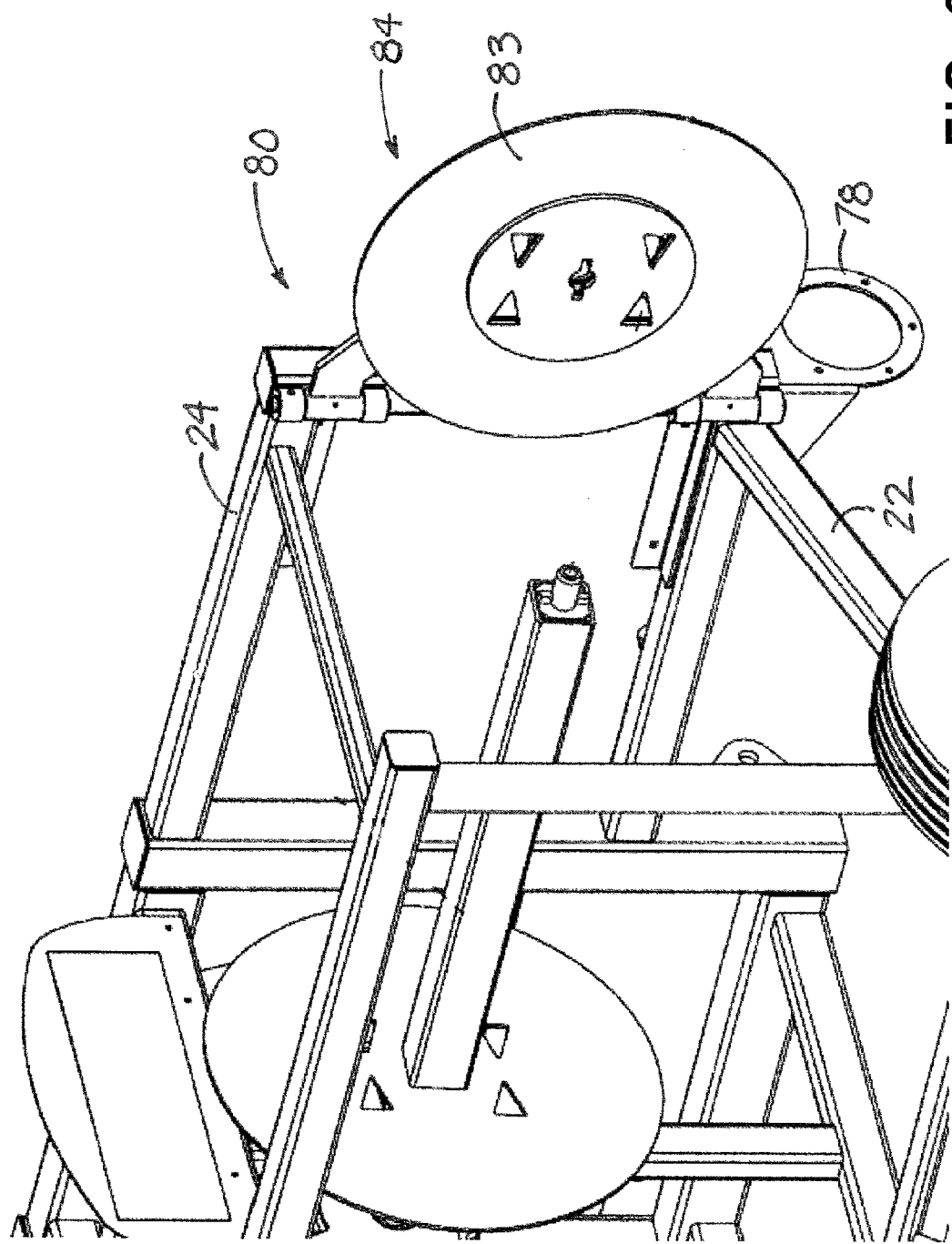
FIG. 6 is a schematic perspective view of a portion of the bag take up assembly, according to an illustrative embodiment.
Figure 7:
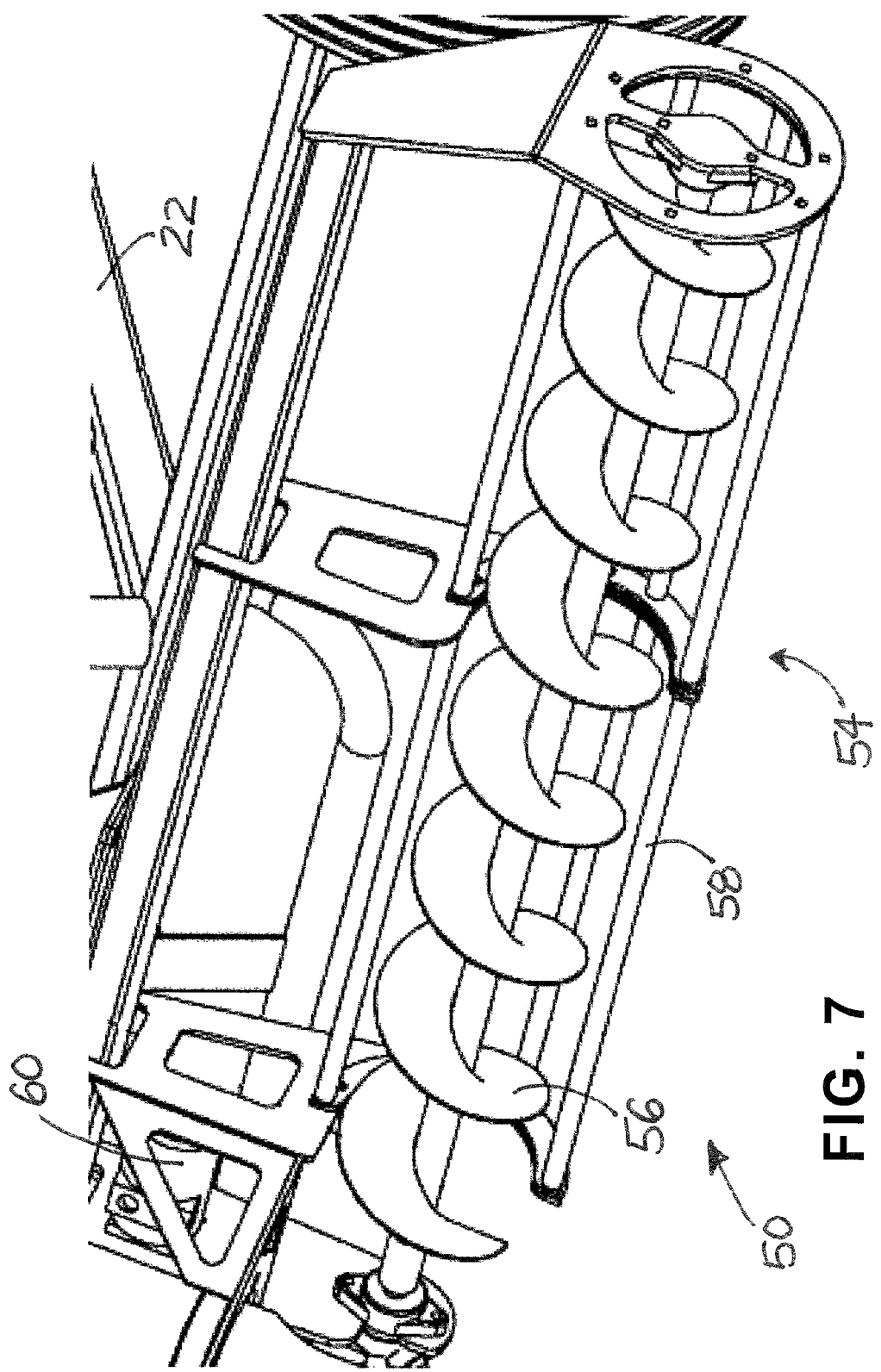
FIG. 7 is a schematic perspective view of a section of the gathering conveyor of the intake assembly, according to an illustrative embodiment.
Figure 8:
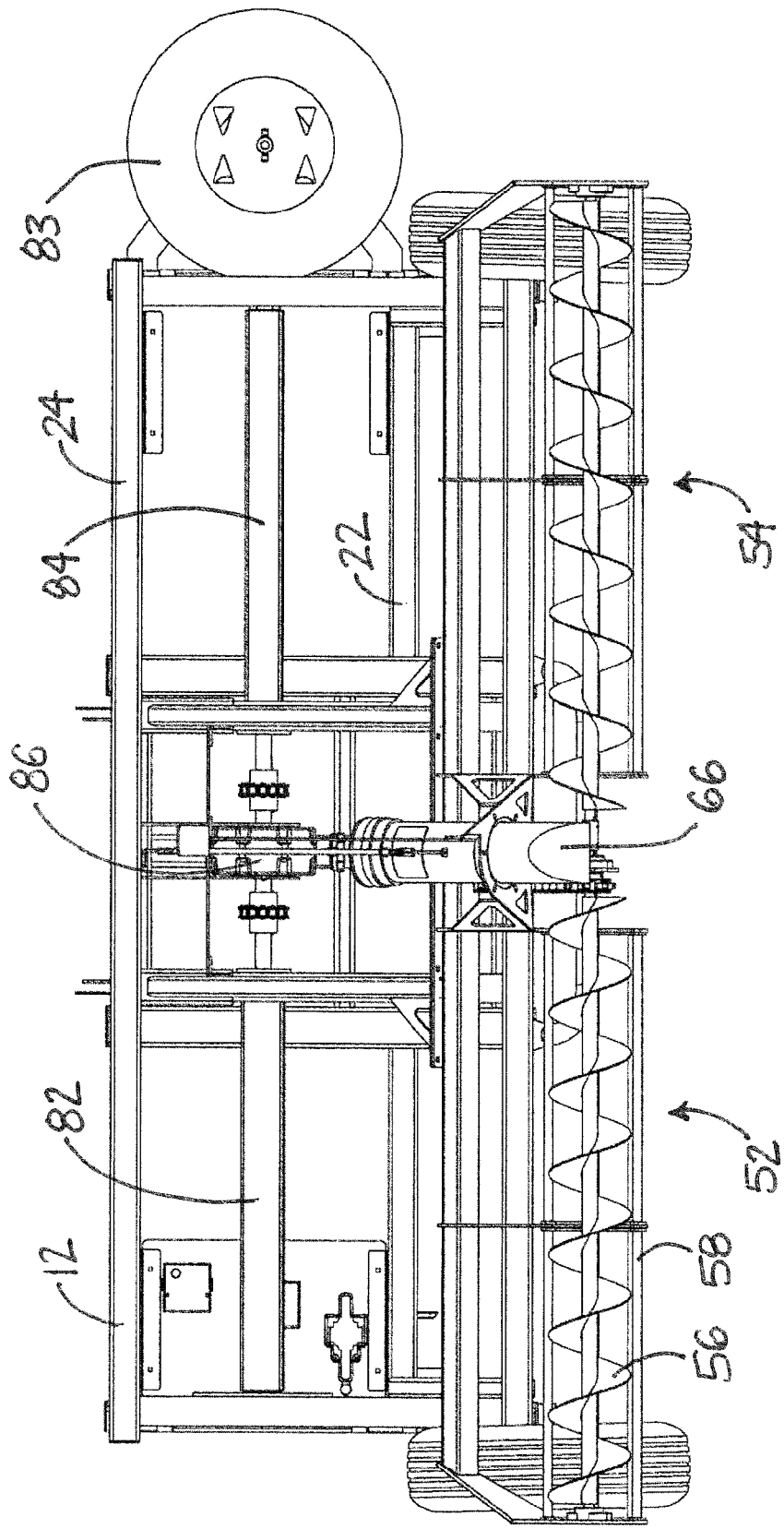
FIG. 8 is a schematic front view of the apparatus, according to an illustrative embodiment.
Figure 9:
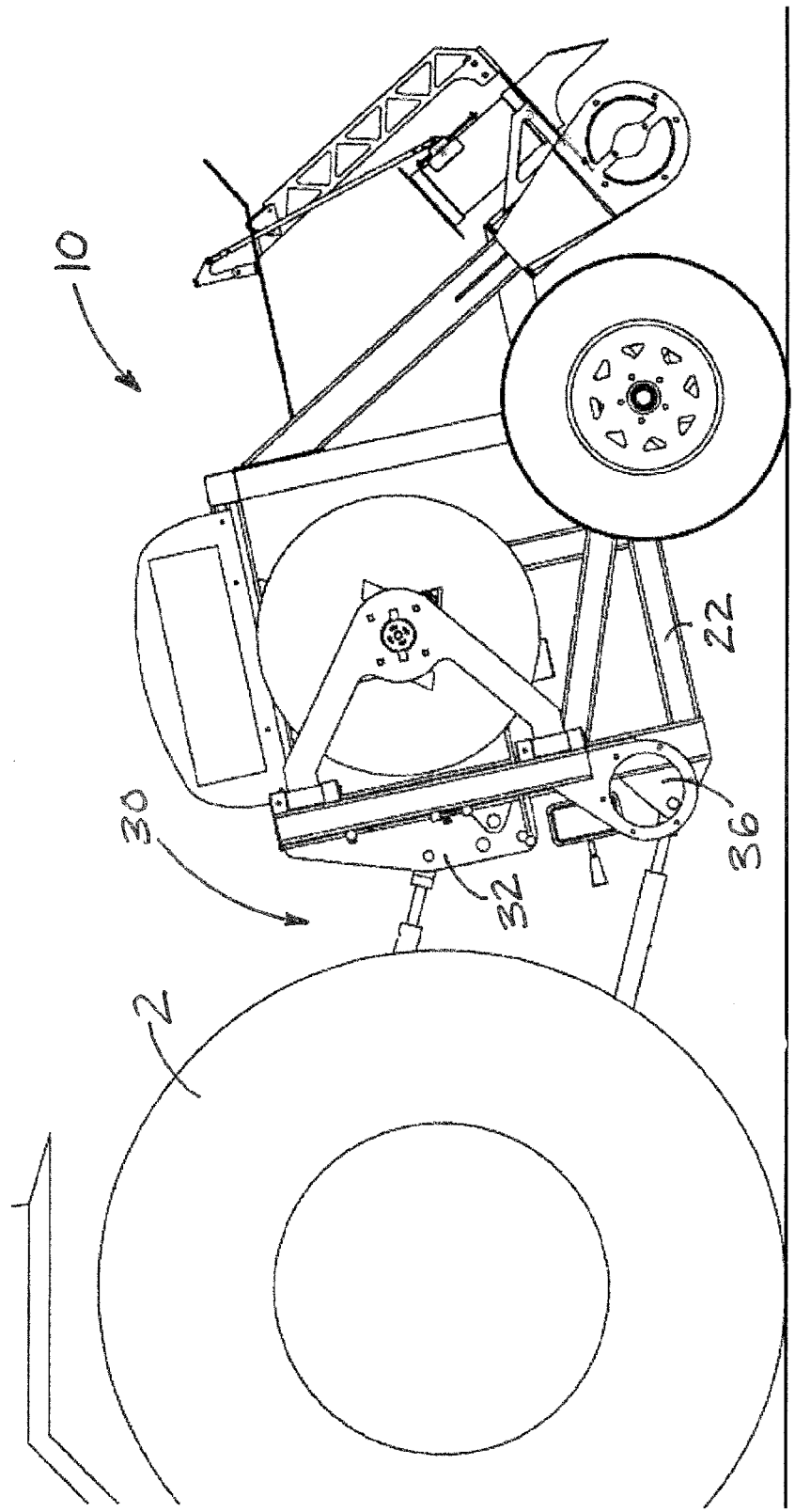
FIG. 9 is a schematic side view of an embodiment of the vacuum attachment apparatus employing a three point hitching assembly to connect the attachment apparatus to a vehicle, and the vacuum attachment apparatus is shown in towing or transport orientation.
Figure 10:
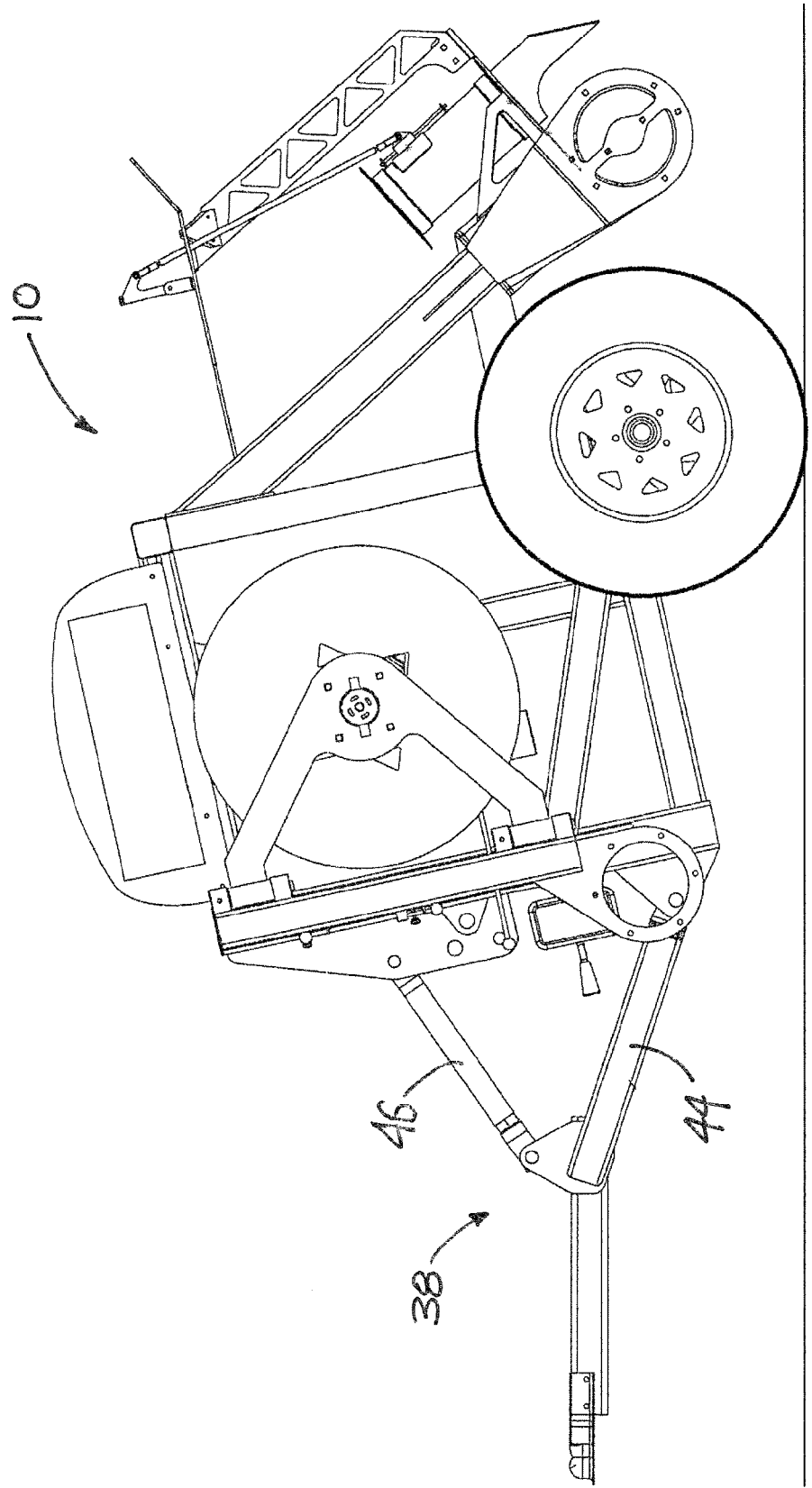
FIG. 10 is a schematic side view of an embodiment of the vacuum attachment apparatus employing a tow bar hitching assembly to connect the attachment apparatus to a vehicle, and the vacuum attachment apparatus is shown in towing or transport orientation.
Figure 11:
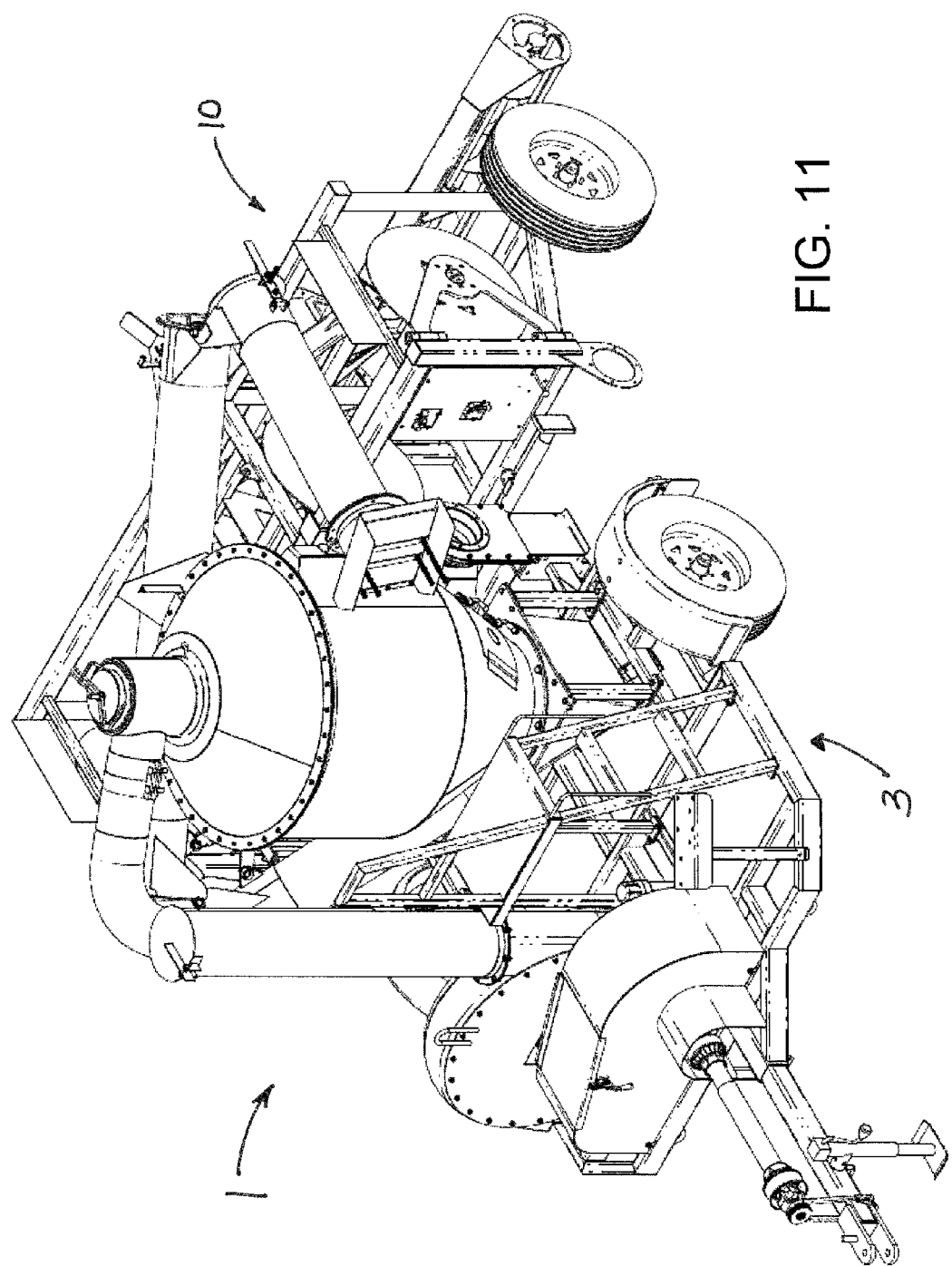
FIG. 11 is a schematic front perspective view of an embodiment of the system including the vacuum attachment apparatus attached to a grain vacuum apparatus.
Figure 12:
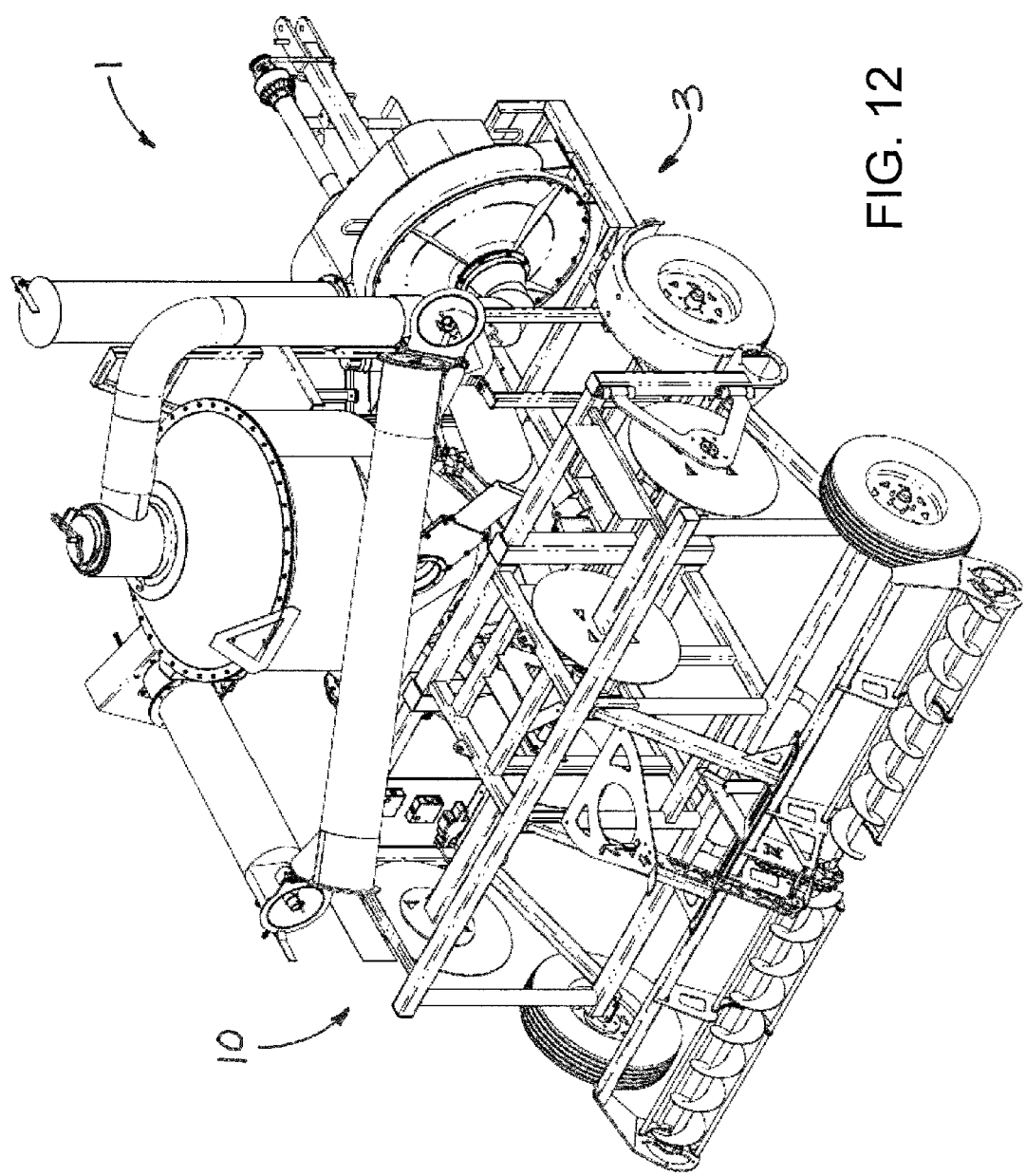
FIG. 12 is a schematic rear perspective view of an embodiment of the system including the vacuum attachment apparatus attached to a grain vacuum apparatus.
Figure 13:
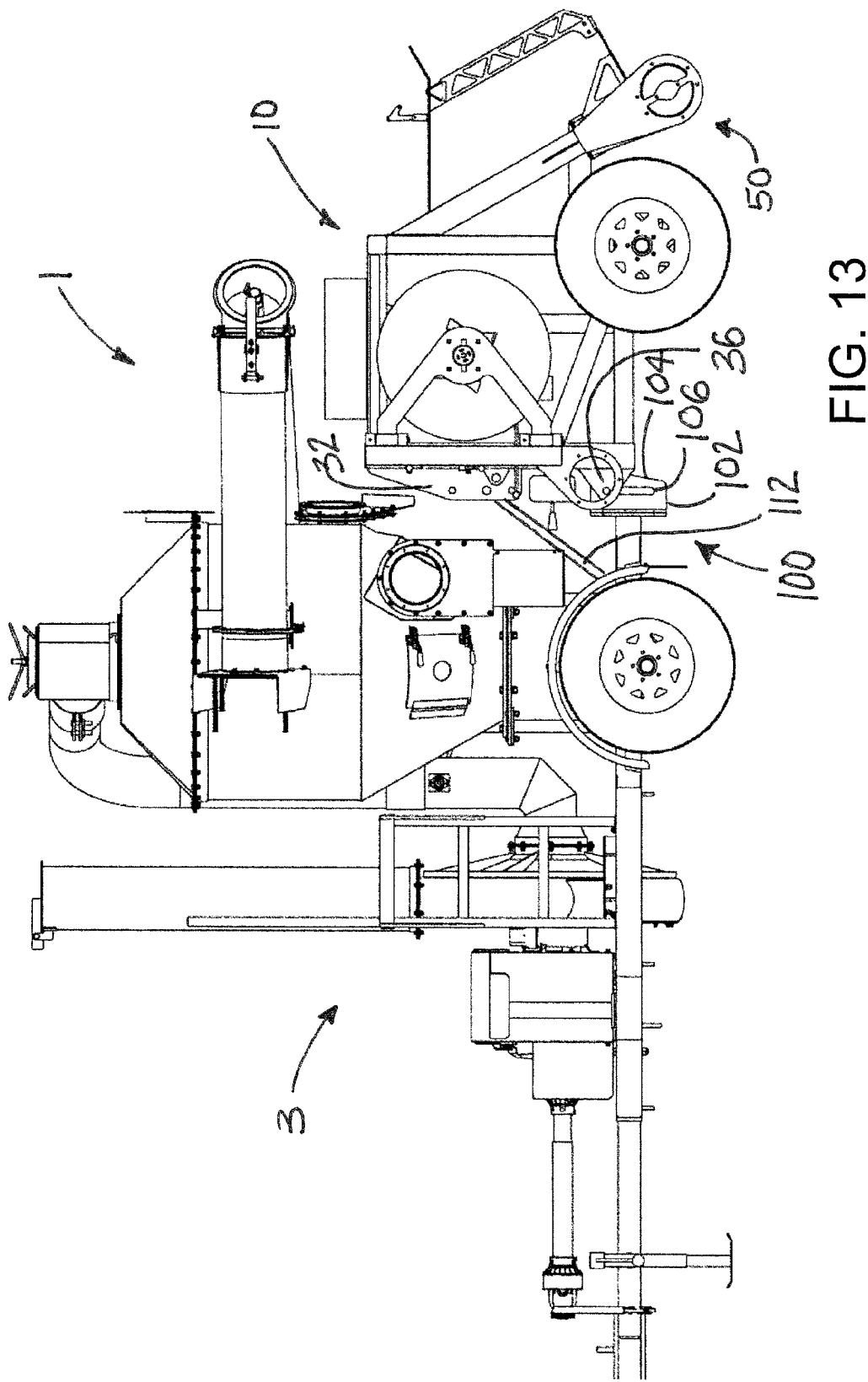
FIG. 13 is a schematic side view of an embodiment of the system including the vacuum attachment apparatus attached to a grain vacuum apparatus.
Figure 14:
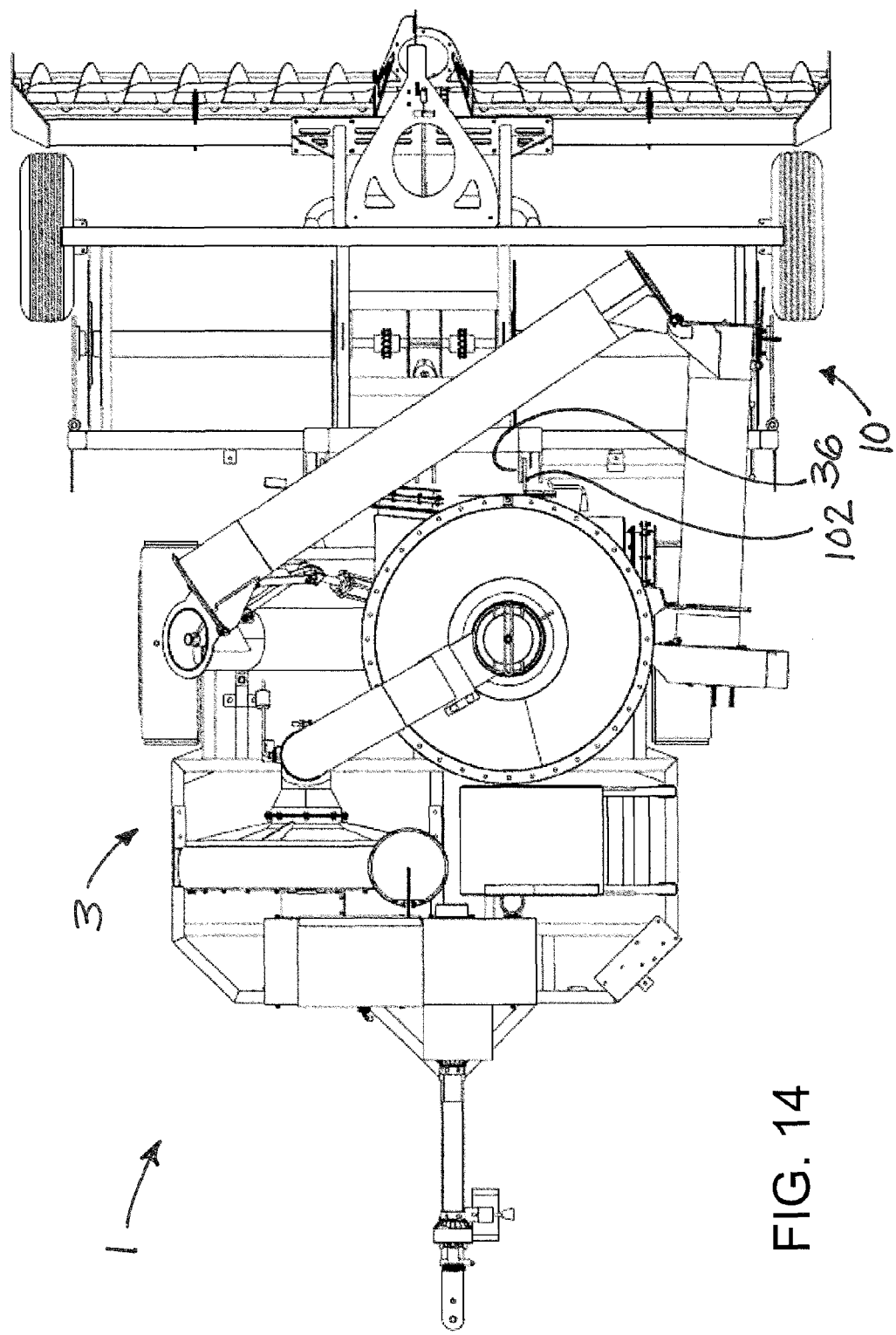
FIG. 14 is a schematic top view of an embodiment of the system including the vacuum attachment apparatus attached to a grain vacuum apparatus.
Figure 15:
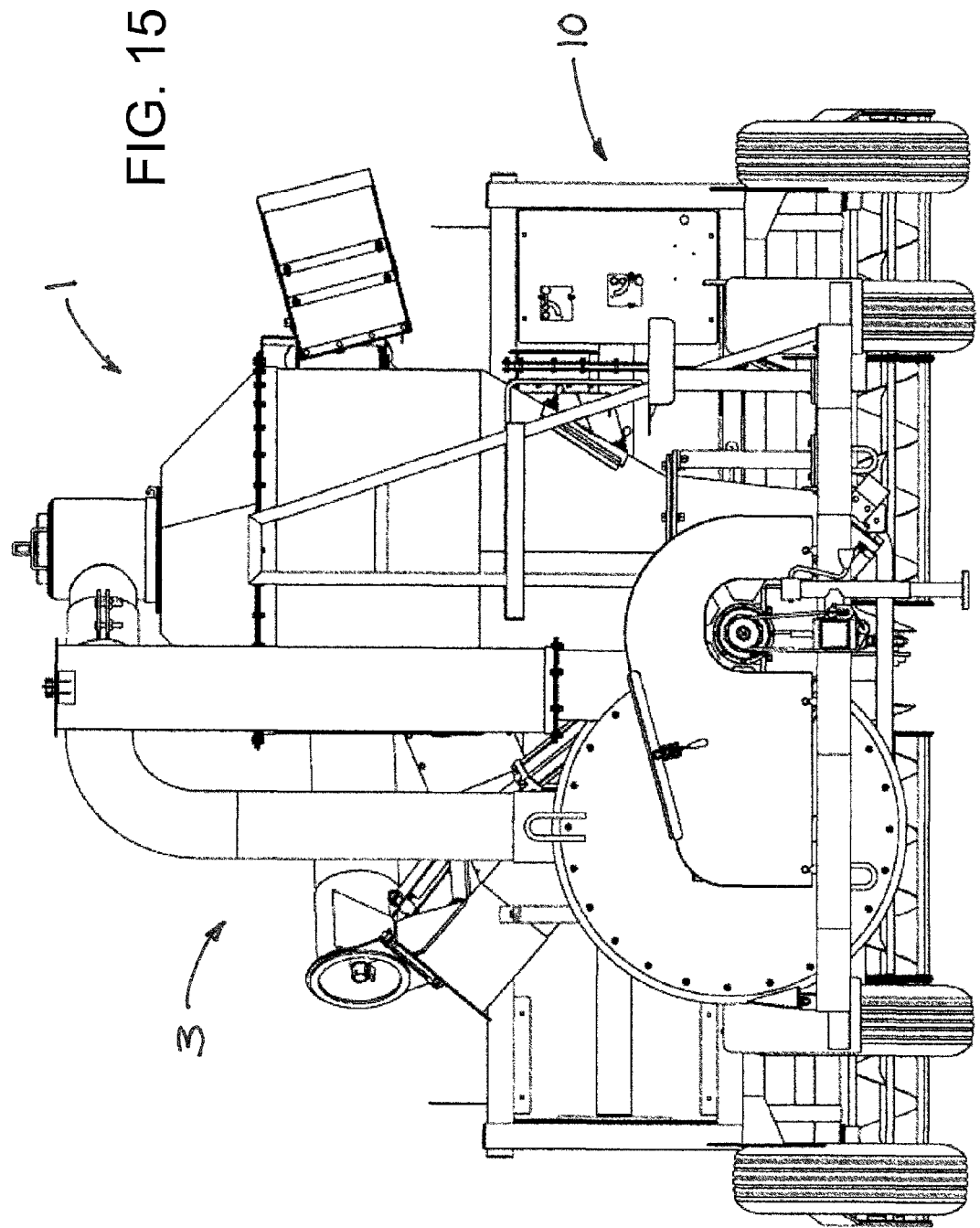
FIG. 15 is a schematic front view of an embodiment of the system including the vacuum attachment apparatus attached to a grain vacuum apparatus.
Figure 16:
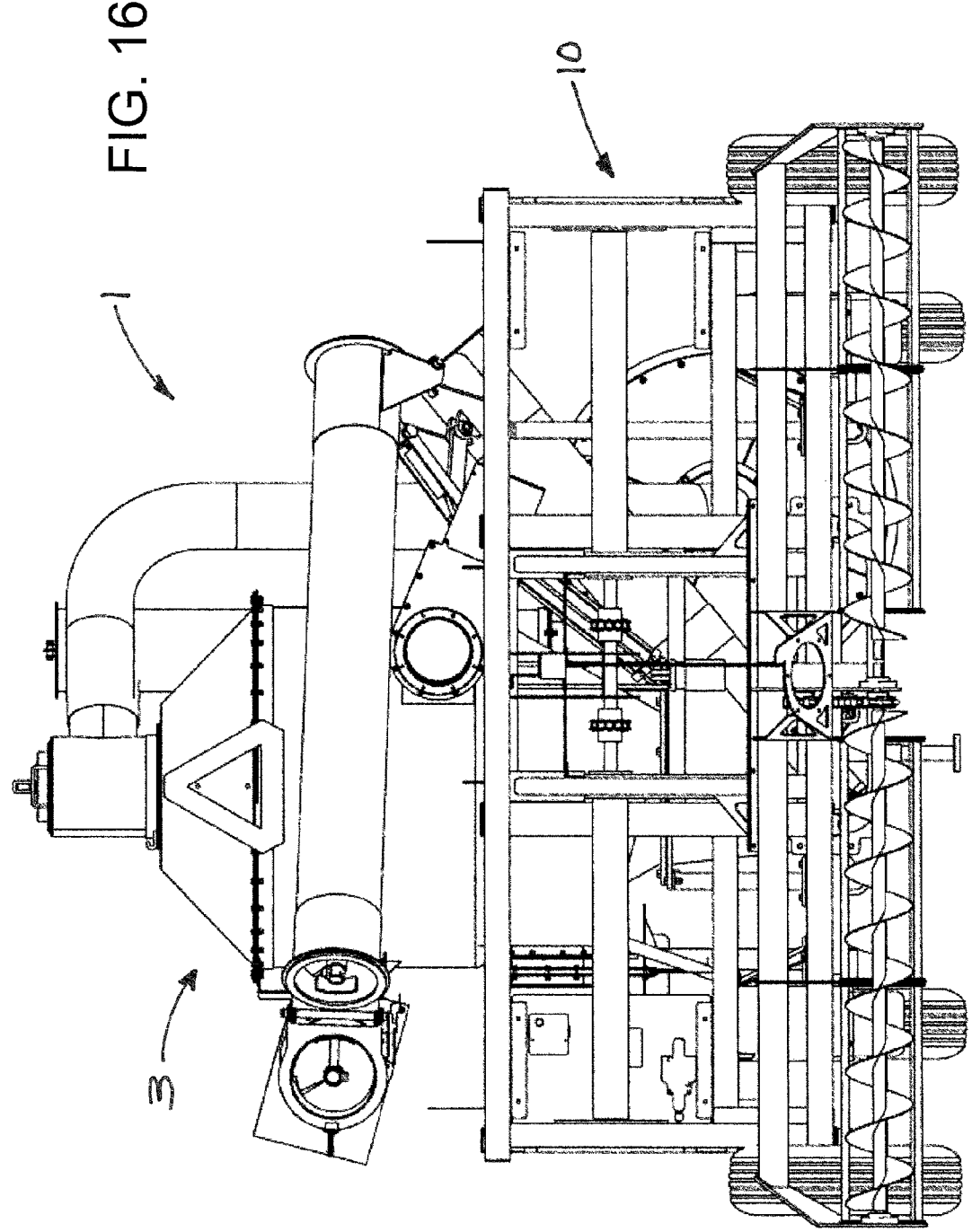
FIG. 16 is a schematic rear view of an embodiment of the system including the vacuum attachment apparatus attached to a grain vacuum apparatus.
Figure 17:
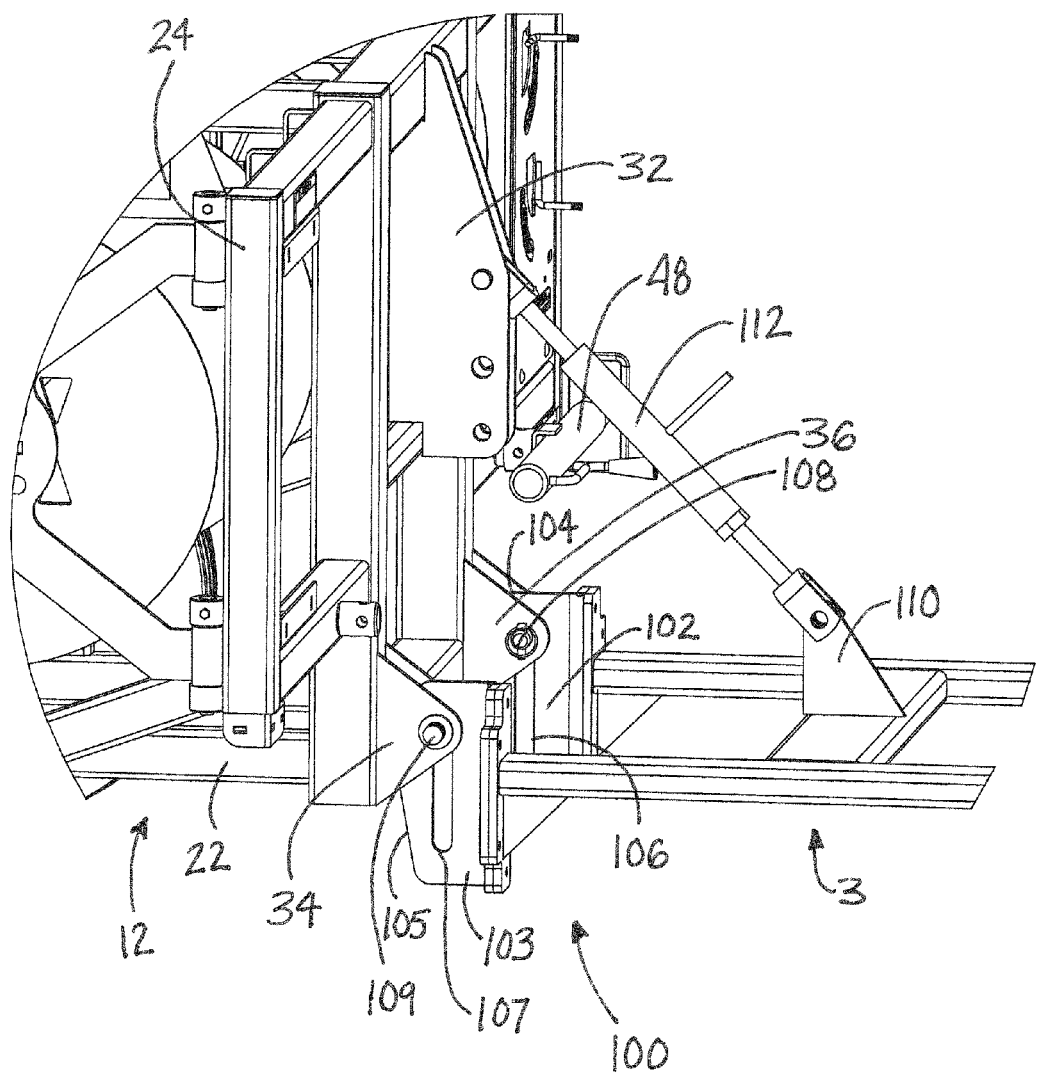
FIG. 17 is a schematic view of an embodiment of the adapter hitching assembly of system.
Figure 18:
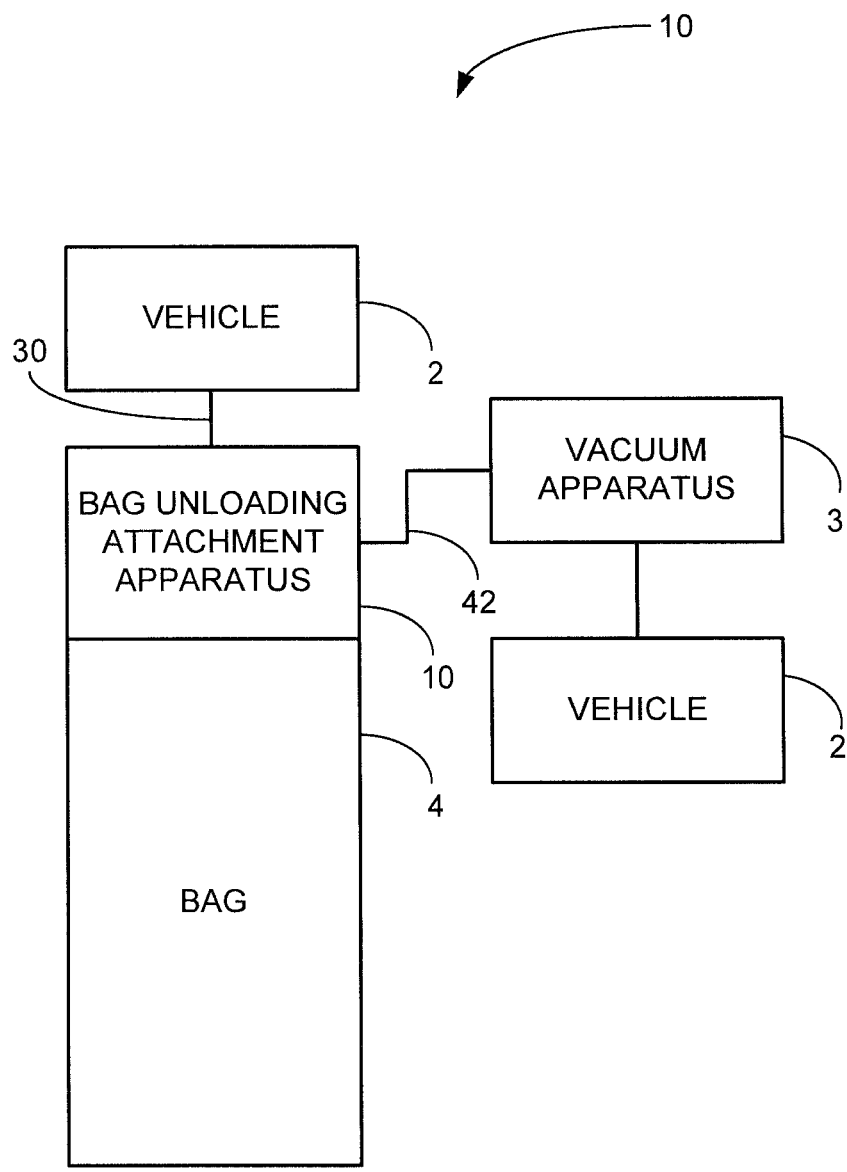
FIG. 18 is a schematic diagram of a system including a vehicle and the vacuum attachment apparatus attached to the vehicle by a three point hitching assembly with a grain vacuum being towed alongside the vehicle and vacuum attachment apparatus.

With reference now to the drawings, and in particular to FIGS. 1 through 20 thereof, a new grain vacuum attachment for unloading grain bags embodying the principles and concepts of the disclosed subject matter will be described.

In general, the disclosure is directed an attachment apparatus 10 that is highly suitable for use in vacuuming particulate material from a storage bag, such as grain from the interior of a grain storage bag, and will be illustratively described in the context of removing grain from a storage bag, although it will be apparent that the scope of the disclosure is not limited to this illustrative usage and may be used for removing other materials from other environments. The apparatus 10 may be suitable, for example, to move substantially dry particles of approximately 0.5 inches or less in maximum width.

In some implementations, the bag unloading attachment apparatus 10 may be used as a part of a system 1 that includes a pulling vehicle, such as a tractor 2, a vacuum apparatus 3 that may be attached to, pushed/pulled and powered by the tractor (such as through, for example, a power take off), and the attachment apparatus that is attached to and pushed/pulled by the vacuum apparatus, which in turn engages a bag 4

In the illustrative embodiments, the attachment apparatus 10 comprises a mobile base 12 for moving across a surface, an intake assembly 14 configured to gather the particulate matter on the surface in a relatively central location, and a vacuum conduction assembly 16 configured to conduct a vacuum condition from a conduit of a vacuum apparatus to a location adjacent to the gathered particulate matter. The apparatus 10 may also include a bag take up assembly 80 that is configured to store the bag after material has been removed from the bag.

In greater detail, the attachment apparatus 10 has a front 18 and a rear 19, and mobile base 12 also has a front 20 generally oriented toward the front 18 of the apparatus 10, and a rear 21 generally oriented toward the rear 19 of the apparatus 10. The mobile base 12 may comprise a base frame 22 with a front and rear that correspond to the front 20 and rear 21 of the mobile base, and may also have opposite lateral sides. The mobile base 12 may also include a support frame 24 that is mounted on the base frame 22 and extends upwardly from the base frame 22 to support various components and elements of the apparatus 10. A pair of wheels 26, 28 may be included on the mobile base 12 and may be mounted on the base frame 22. In some embodiments, such as the illustrative embodiments, two pairs of wheels may be utilized with a pair of wheels being mounted toward one of the lateral sides of the base frame. Each of the wheels 26, 28 may be positioned toward the rear of the base frame, and may be positioned inwardly from one of the lateral sides of the base frame.

The mobile base 12 may also include a hitching assembly for removably hitching the apparatus 10 to another mobile base, such as a vehicle or a trailer for pulling behind a vehicle. In some embodiments, the hitching assembly is configured to attach the apparatus to a vehicle directly, such as using a three point type hitch or a tow bar hitch. In some of the most preferred embodiments, the three point type hitch is a permanent part of the mobile base and is utilized with various components to form different hitching structures for different hitching applications. In some embodiments, the hitching assembly permits hitching of the attachment apparatus to a trailer that supports a vacuum apparatus that may be towed behind a vehicle. In such embodiments, for example, the apparatus 10 may be pulled in tandem directly behind a vehicle, or may be towed in tandem behind a grain vacuum apparatus on a trailer, which in turn is pulled behind a vehicle such as a tractor.

In some configurations, the hitching assembly may include a three point hitching assembly with three points of attachment, such as a three point hitch, with mounting points or brackets 32, 34, and 36 being mounted on the portions of the frame (see, for example, FIGS. 2, 4, 9, and 17). The three point type hitching apparatus 30 may thus take advantage of the three point hitch that is equipped on many agricultural tractors. Adjustment of the three point links of the three point hitch may serve to adjust the relative orientation of the mobile base, and more specifically, the intake assembly, with respect to the ground surface and any bag thereon. In a system 1 in which the vacuum attachment apparatus 10 is directly attached to the tractor or other vehicle using the three point hitching assembly, the grain vacuum may be pulled by another vehicle alongside the tractor pulling the attachment apparatus 10, and a vacuum hose 42 may connect the grain vacuum apparatus 3 to the vacuum attachment apparatus 10.

In some configurations, the hitching assembly may include a tow bar hitching assembly 38 which employs a tow bar that permits the attachment apparatus 10 to be hitched to vehicles that do not have a three point hitch, such as a pickup truck. The tow bar hitching assembly 38 may be removably mounted on the mobile base 12 (see FIGS. 10 and 18), and may utilize the mounting points 32, 34, 36 of the three point hitching assembly 30, although this is not critical. The tow bar hitching assembly 38 may include a lower tow bar 44, which may be pivotally mounted on the base frame of the mobile base, and in many embodiments the lower tow bar may be a permanent part of the hitching assembly. The tow bar hitching assembly 38 may also include an upper link 46 attached to the frame of the mobile base and to the lower tow bar, and in many embodiments the upper link may be a permanent part of the hitching assembly. The upper link may have an adjustable length that functions to change the orientation of the tow bar with respect to the frame of the mobile base, and when the tow bar is hitched to a vehicle, the orientation of the mobile base may be changed to move the intake assembly closer to or away from the ground, or a bag into which the apparatus 10 is being moved. The vacuum apparatus may also be towed by another vehicle alongside the vehicle and the attachment apparatus 10.

In some configurations, the hitching assembly may include an adapter hitching assembly 40 that permits the vacuum attachment apparatus to be attached directly to the vacuum apparatus 3 so that the attachment apparatus 10 may be pulled or pushed behind the vacuum apparatus. In some embodiments, the adapter hitching assembly 40 may be attachable to the mounting points 32, 34 and 36 utilized for the three point hitching assembly. The configuration of the elements of the adapter hitch assembly 40 may be adapted to the particular configuration of the vacuum apparatus to which the apparatus 10 is to be attached. As there may be variation in the configurations of the frames of the vacuum apparatus available, the configurations of the elements employed to attach the apparatus to the vacuum apparatus may necessarily be varied. The hitching assembly may thus be adapted to different mounting configurations, and additional structure may be interchangeably included in the hitching assembly to accommodate mounting to different vehicles or trailers. Optionally, the grain vacuum apparatus 3 may be provided from the manufacturer with mounting elements that are designed for mounting the vacuum attachment apparatus 10.

The mobile base 12 may also include a support jack 48 mounted on the base frame 22 to support a portion of the base frame on the surface on which the apparatus is resting. The support jack 48 may be extendable away from the base frame 22 to contact the surface and may be retractable back toward the base frame. The jack 48 may facilitate adjustment of the distance between the front of the base frame and the surface.

The intake assembly 14 of the apparatus 10 is mounted on the mobile base 12, and may be positioned toward the rear 21 of the mobile base 12. The intake assembly 14 may comprise a gathering conveyor 50 that is configured to move material in a laterally inward direction from laterally-outward locations. The gathering conveyor 50 may be positioned at the rear 19 of the apparatus, and may be positioned toward a bottom of the apparatus, generally lower than the support frame 24. The gathering conveyor 50 may be oriented generally transversely with respect to the apparatus 10 to extend or increase the width of in the interior of the bag that is able to be accessed by the vacuum conduction assembly 16 beyond the reach of the vacuum conduction assembly alone. In other words, the reach of the vacuum conduction assembly is increased in lateral directions by the gathering conveyor. The gathering conveyor 50 may include a pair of gathering conveyor sections 52, 54, with each of the sections being positioned on a lateral side of a longitudinal axis bisecting the apparatus 10 from front to rear, and being positioned generally on lateral sides of the vacuum conduction assembly 16. Each of the gathering conveyor sections 52, 54 may comprise an auger 56, and an auger guard 58 extending about at least a portion of the auger 56 to restrict contact between the auger and the surface of the bag below the auger. Flighting of each of the gathering auger sections 52, 54 may move material in opposite directions toward a center of the gathering conveyor 50 when the gathering auger sections are rotated together as a unit. The augers 56 of the gathering conveyor sections 52, 54 may be generally rotatable about a transverse horizontal axis extends substantially parallel to the surface from which material is to be picked up. An auger motor 60 may be connected to the auger of the gathering conveyor to rotate the auger. The motor 60 is most preferably driven hydraulically, and driven using hydraulic power from a tractor or other prime mover with provision for powering other equipment, although this is not critical.

The vacuum conduction assembly 16 may be configured to conduct a vacuum from an outlet opening 62 of the apparatus 10 to an inlet opening 64 of the apparatus 10 that is positioned adjacent to the intake assembly 14. The inlet opening 64 may be positioned rearwardly of the intake assembly 14, and may be positioned relatively higher than the intake assembly. The vacuum conduction assembly 16 may comprise a vacuum conduit 66 that extends between, and is in fluid communication with, the inlet opening 62 and the outlet opening 64. The vacuum conduit 66 has an inlet end 68 with the inlet opening 64 and an outlet end 70 with the outlet opening 62. The inlet end 68 may extend rearwardly of the gathering conveyor 14, and the end 68 may be positioned somewhat above the lowest extent of the gathering conveyor. The inlet end 68 may also be substantially centrally located in a lateral direction, at a location that generally corresponds to the position between the gathering conveyor sections 52, 54. The vacuum conduit 66 may have a degree of flexibility, although this is not critical.

The inlet end 68 of the vacuum conduit 66 of the vacuum conduction assembly 16 may be configured to resist or prevent a portion of the bag material under the inlet opening from moving into the inlet opening and blocking the lumen of the conduit 66. The end 68 may be shaped with a notch 72 formed in the edge 74 of the conduit 66 that defines the inlet opening 64 so that the edge of the opening 64 does not lie in a single plane. The notch 72 may be located toward the front of the apparatus 10 such that the notch is located away from the direction of travel of the apparatus when grain is being moved toward the interior of the bag. The portion of the edge 74 that is toward the rear of the apparatus may be substantially straight and may extend transverse to the generally longitudinal axis of the conduit 66. Additionally, a portion of the wall of the conduit 66 adjacent to the end 68 may be flattened as compared to the generally cylindrical nature of the rest of the conduit.

The assembly 16 may also comprise a conduit support frame 76 that may extend rearwardly from the mobile base 12 to support at least a portion of the vacuum conduit 66. The conduit 66 may be mounted on the support frame 76 in a manner that permits movement of the conduit with respect to the frame, such as, for example, sliding movement of the conduit 66 with respect to the frame 76 to permit adjustment of the proximity of the end 68 to the intake assembly to, for example, increase or decrease the efficiency of the take up of the contents of the bag. Optionally, a hose support 78 may be mounted on one of the frames to provide additional support to a vacuum hose when it is attached to the vacuum conduit 66, and the hose support 78 may comprise a ring and may be located, for example, toward the front of the mobile base, although other configurations and locations may also be suitable.

The bag take up assembly 80 may receive and store the discarded portions of the bag after being emptied configured to store the bag after material has been removed from the bag. In some embodiments of the take up assembly 80, the bag is split into two substantially equal portions and stored on separate spools. The bag take up assembly 80 may comprise a pair of take up spools 82, 84, and each of the take up spools may be positioned on a lateral side of the vacuum conduction assembly 16. Each of the take up spools 82, 84 may be rotatable about a substantially horizontal axis, and the take up spools may be driven by a take up motor 86. The take up motor may be driven hydraulically, and driven using hydraulic power from a tractor or other prime mover, although again this is not critical. One of the flanges 83 of each of the spools 82, 84 may removable from the remainder of the spool, and may be pivotally mounted on the frame 24 to permit the flange 83 to move between a mounted condition and dismounted condition. The dismounted condition of the flange 83 may allow the remnants of the bag wrapped on the spool to be removed from the spool, while the mounted condition of the flange holds the remainder of the bag on the spool. Further, a tubular sleeve 85 may be removable from the spool 82, 84 when the flange 83 is in the dismounted condition to further facilitate the removal of the bag remainder.

The bag take up assembly 80 may also include a pair of sharpened edges 96, 98 positioned to split a bag longitudinally into two portions or strips. The sharpened edges 96, 98 may be positioned to split the bag in two locations, and a first one 96 of the sharpened edges may be located above a second one 98 of the sharpened edges. The first sharpened edge 96 may be located above the vacuum conduit 66 and the second sharpened edge 98 may be located below the vacuum conduit. The locations of the sharpened edges 96, 98 may also be between the take up spools 82, 84.

In use, the end of the hose of a grain vacuum is connected to the outlet end 70 of the vacuum conduction assembly 16. The apparatus 10 may be moved into the opening of the so that the gathering conveyor 50 is at least partially positioned in the interior of the bag and rests on the inner surface of the bag. The apparatus 10 may be moved rearwardly toward the particulate material in the bag until the conveyor 50 comes into contact with the material, and the auger of the conveyor 50 may be rotated by the auger motor 60 to draw the material inwardly toward the inlet opening 64 of the vacuum conduction assembly. Portions of the bag may be drawn across the sharpened edges 96 and 98 to split the emptied portion of the bag into two portions, and the portions may each be wrapped about one of the spools 82, 84. The take up motor 86 may be actuated to rotate the spools 82, 84 and draw the split portions of the bag onto the spools, and in turn draws the apparatus 10 toward the interior of the bag. The vacuum apparatus 3 may be actuated to cause the vacuum to be applied to the vacuum conduction assembly, and particulate material moved inwardly toward the inlet opening of the vacuum conduit, where the material may be drawn into the conduit and the vacuum.

The apparatus 10 may also include controls for controlling the operation of the various assemblies of the apparatus, and this may be accomplished by controlling the supply of hydraulic fluid to the motors rotating the gathering conveyor (to control the rate at which the material is moved toward the conduit 66) and the take up spools (to control the rate at which the bag is being drawn into the apparatus and the apparatus is being drawn toward the bag). In most embodiments, the wheels are not driven and the apparatus 10 may rely upon another element to move the apparatus with respect to a bag 4. As the motors and actuators on the attachment apparatus 10 may operate on hydraulic (or other fluid) power from the tractor or other prime mover, the apparatus 10 may not require any on board power source.

Figure 19:
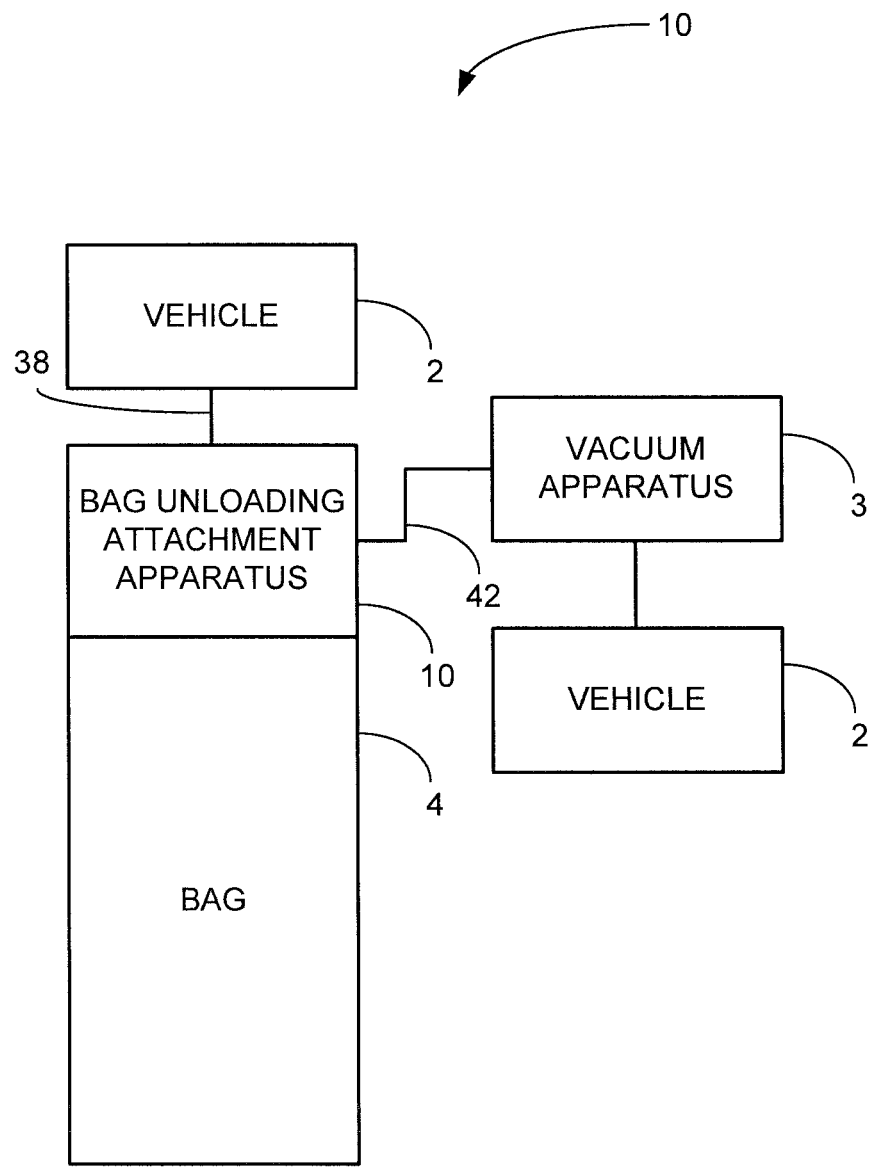
FIG. 19 is a schematic diagram of a system including a vehicle and the vacuum attachment apparatus attached to the vehicle by a tow bar hitching assembly with a grain vacuum being towed alongside the vehicle and vacuum attachment apparatus.
Figure 20:
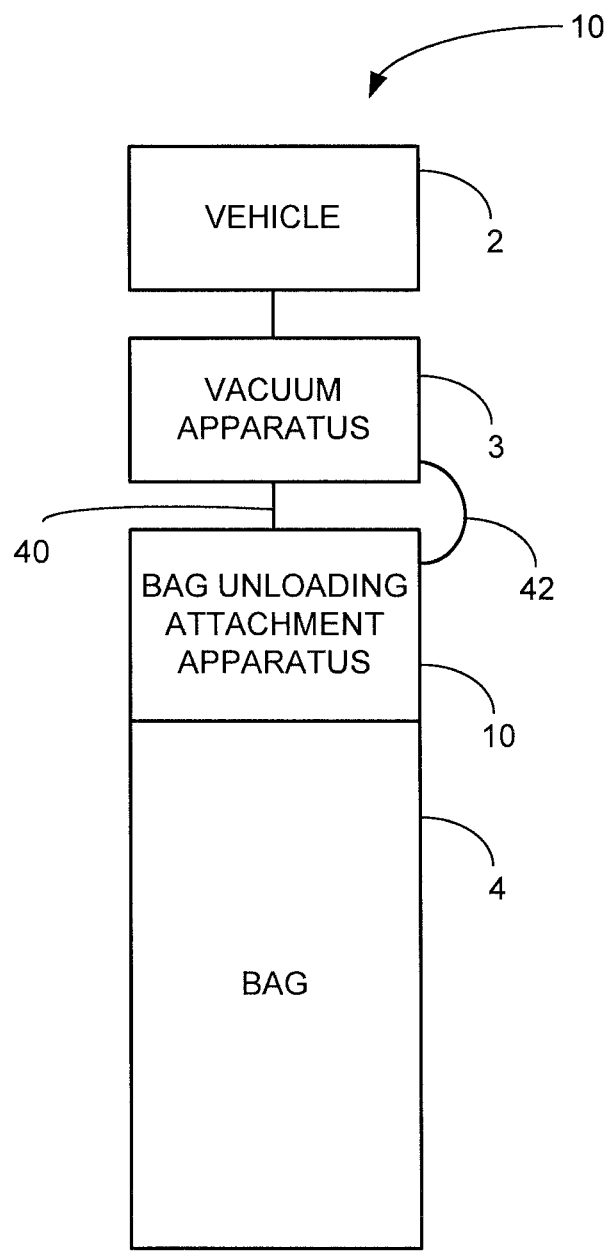
FIG. 20 is a schematic diagram of a system including a vehicle, a grain vacuum attached to the vehicle, and the vacuum attachment apparatus attached to the grain vacuum in a tandem arrangement.

In some embodiments of the system 1, the attachment apparatus 10 is attached to the vacuum apparatus 3 which is in turn attached to the vehicle 2, so that the vehicle may be able to push and pull the vacuum apparatus as well as the attachment apparatus, for example, toward or away from a bag 4 (schematically shown in, for example, FIG. 19). In greater detail, FIGS. 11 through 16 show embodiments of a system 1 that includes the attachment apparatus 10 and the vacuum apparatus 3 attached to each other by an embodiment of the adapter hitching assembly 40 to permit direct attachment of these components together and to the vehicle so that the vehicle, vacuum apparatus, and attachment apparatus are oriented in a substantially tandem arrangement with each other and (optionally) with the bag that is being unloaded by the system. In these embodiments, the adapter hitching assembly 40 includes an attachment linkage 100 that is connected to the frame of the vacuum apparatus 3 and the frame of the mobile base 12 of the attachment apparatus. The attachment linkage 100 may be substantially rigidly attached or mounted on the frame of the vacuum apparatus 3 at a location toward the rear of the apparatus 3 (e.g., rearward when the apparatus 3 is being towed on a road) and attached to the frame of the attachment apparatus 10. In some of the most preferred embodiments, the attachment linkage comprises a pair of primary links 102, 103 that are laterally- and horizontally-spaced with respect to each other, and may correspond to the positions of the second 34 and third 36 mounting points of the three point hitching assembly 30. The respective outboard ends 104, 105 of the primary links 102, 103 may have apertures 106, 107 for receiving connecting pins 108, 109 that extend through the respective first and second mounting points. The apertures may be configured to permit substantially vertical movement of the pin with respect to the outboard ends 104, 105 to permit the adjustment of the vertical position of the front 18 of the apparatus 10 which in turn adjusts the vertical position of the rear 19 of the apparatus 10 and more specifically the vertical position of the gathering conveyor 50 above the ground and the grain in a bag to be emptied. In the illustrative embodiments, the apertures 106, 107 may be elongated in a vertical direction to permit the vertical movement of the pin and the first and second mounting points. The attachment linkage 100 may also include a secondary link 110 mounted on the frame of the vacuum apparatus 3 that may be located between the primary links 102, 103. An adjustment link 112 may be connected to the secondary link 110 and to the first mounting point 32, and may have an adjustable length to adjust the distance between the secondary link 110 and the first mounting point 32 when connected thereto. Adjustment of the length of the adjustment link 112 tends to move the first mounting point 32 upward and downward with respect to the secondary link 110 and the frame of the vacuum apparatus 3, and thus tends to raise and lower the gathering conveyor 50 with respect to the ground in a relatively opposite manner.

The character of the attachment of the attachment linkage 100 to the vacuum apparatus 3 and attachment apparatus 10 facilitates the ability of the vehicle (such as the aforementioned tractor) to push the apparatus 3, 10 in a tandem configuration toward and against the bag and the contents of the bag for progressively unloading the bag. The attachment linkage 100 may be removable from both the vacuum apparatus 3 and the attachment apparatus 10 to permit uses with other devices and in other configurations. The adapter hitch assembly 40 may be configured to resist pivoting or turning of the attachment apparatus 10 about a substantially vertical axis with respect to the vacuum apparatus 3. Preferably, although not necessarily, the attachment linkage 100 is horizontally aligned with the hitch structure of the vacuum apparatus 3. As the vacuum apparatus typically includes a pair of wheels, the attachment of the attachment apparatus to the vacuum apparatus may help to partially support the attachment apparatus.

Significantly, in many preferred embodiments of the system, movement, guidance, rolling resistance and braking for the attachment apparatus 10 is provided by a separate element such as the vehicle, as structures providing some or all of these capabilities may not be integrated into the attachment apparatus. Similarly, the vacuum function may also be provided by a separate element such as a grain vacuum apparatus and is not integral with the attachment apparatus. The attachment apparatus thus provides the user with the ability to utilize other apparatus (that have separate utility from grain bag unloading) for unloading a grain bag without the substantial investment that is often required for a dedicated grain bag unloader apparatus. Prior to and after use of the attachment apparatus, the vehicle and grain vacuum apparatus can be used separately for different purposes With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An attachment for vacuuming particulate material from a storage bag having a perimeter wall with an opening, the attachment comprising:
   a mobile base for moving across a ground surface, the mobile base having a front, a rear, and an axle with wheels positioned between the front and rear;
   an intake assembly extending from the rear of the mobile base, the intake assembly including a gathering conveyor configured to move material in a laterally inward direction toward a center of the intake assembly;
   a vacuum conduction assembly configured to conduct a vacuum condition from an outlet opening to an inlet opening positioned adjacent to the center of the intake assembly;
   a hitching assembly for hitching the mobile base to another mobile base, the hitching assembly including a tow bar pivotally mounted on the mobile base and extending from the front of the mobile base, the tow bar of the hitching assembly and the gathering conveyor being positioned on opposite sides of the axle of the mobile base such that pivoting of the tow bar with respect to the mobile base effectively adjusts a vertical position of the gathering apparatus with respect to a ground surface below the gathering conveyor;
   wherein moving the tow bar downwardly with respect to the mobile base pivots the gathering conveyor on the axle toward the ground; and
   wherein moving the tow bar upwardly with respect to the mobile base pivots the gathering conveyor on the axle away from the ground.

2. The attachment of claim 1 additionally comprising a bag take up assembly mounted on the mobile base and configured to store the bag after material has been removed from the bag.

3. The attachment of claim 2 wherein the bag take up assembly comprises a pair of take up spools, each of the take up spools being positioned on a lateral side of the vacuum conduction assembly.

4. The attachment of claim 2 wherein the bag take up assembly comprises a pair of sharpened edges positioned to split the bag in two locations into two longitudinal strips.

5. The attachment of claim 1 wherein the inlet opening of the vacuum conduction assembly is positioned rearwardly of the intake assembly.

6. The attachment of claim 1 wherein the vacuum conduction assembly comprises a vacuum conduit extending between and in fluid communication with the inlet opening and the outlet opening.

7. The attachment of claim 1 wherein the gathering conveyor includes a pair of gathering conveyor sections, each of the gathering conveyor sections comprising an auger and an auger guard extending about at least a portion of the auger to restrict contact between the auger and the surface of the bag below the auger.

8. The attachment of claim 7 wherein flighting of each of the gathering auger sections is configured moving material in opposite directions toward a center of the gathering conveyor when the gathering auger sections are rotated together.

9. The attachment of claim 1 wherein the hitching assembly comprises a three point mount structure on the mobile base configured to mount to a three point hitch of a vehicle.

10. The attachment of claim 1 wherein the hitching assembly includes an actuator configured to pivot the tow bar with respect to the mobile base.

11. The attachment of claim 1 wherein the mobile base is configured such that moving the tow bar downwardly with respect to the mobile base moves the front of the mobile base upwardly and pivots the gathering conveyor at the rear of the mobile base downwardly toward the ground; and
   wherein the mobile base is configured such that moving the tow bar upwardly with respect to the mobile base moves the front of the mobile base downwardly and pivots the gathering conveyor at the rear of the mobile base upwardly away from the ground.

12. An attachment for vacuuming particulate material from a storage bag having a perimeter wall with an opening, the attachment comprising:
   a mobile base for moving across a ground surface, the mobile base having a front and a rear;
   an intake assembly positioned toward a rear of the mobile base, the intake assembly including a gathering conveyor configured to move material in a laterally inward direction toward a center of the intake assembly;
   a vacuum conduction assembly configured to conduct a vacuum condition from an outlet opening to an inlet opening positioned adjacent to the center of the intake assembly;
   a bag take up assembly mounted on the mobile base and configured to store the bag after material has been removed from the bag;
   wherein the bag take up assembly comprises a pair of take up spools, each of the take up spools being positioned on a lateral side of the vacuum conduction assembly;
   wherein the bag take up assembly comprises a pair of sharpened edges positioned to split the bag in two locations into two longitudinal strips;
   wherein the inlet opening of the vacuum conduction assembly is positioned rearwardly of the intake assembly;
   wherein the vacuum conduction assembly comprises a vacuum conduit extending between and in fluid communication with the inlet opening and the outlet opening;
   a hitching assembly configured to removably attach the mobile base to another mobile base;
   wherein the gathering conveyor includes a pair of gathering conveyor sections, each of the gathering conveyor sections comprising an auger and an auger guard extending about at least a portion of the auger to restrict contact between the auger and the surface of the bag below the auger; and
   wherein flighting of each of the gathering auger sections are configured moving material in opposite directions toward a center of the gathering conveyor when the gathering auger sections are rotated together.

13. An attachment for vacuuming particulate material from a storage bag having a perimeter wall with an opening, the attachment comprising:
   a mobile base for moving across a ground surface, the mobile base having a front and a rear;
   an intake assembly positioned toward a rear of the mobile base, the intake assembly including a gathering conveyor configured to move material in a laterally inward direction toward a center of the intake assembly; and a vacuum conduction assembly configured to conduct a vacuum condition from an outlet opening to an inlet opening positioned adjacent to the center of the intake assembly; and a bag take up assembly mounted on the mobile base and configured to store the bag after material has been removed from the bag;

wherein the bag take up assembly comprises a pair of take up spools, each of the take up spools being positioned on a lateral side of the vacuum conduction assembly.

14. The attachment of claim 13 additionally comprising a hitching assembly configured to removably attach the mobile base to another mobile base.

15. The attachment of claim 14 wherein the hitching assembly comprises a tow bar hitching assembly mounted on the mobile base and including a tow bar pivotally mounted on the mobile base, the mobile base being configured such that pivoting of the tow bar with respect to the mobile base effective adjusts a vertical position of the gathering apparatus with respect to a ground surface below the gathering conveyor.

16. The attachment of claim 14 wherein the hitching assembly is configured to attach to the mobile base to a grain vacuum apparatus such that the mobile base moves with the grain vacuum apparatus.

17. An attachment for vacuuming particulate material from a storage bag having a perimeter wall with an opening, the attachment comprising:

a mobile base for moving across a ground surface, the mobile base having a front and a rear;

an intake assembly positioned toward a rear of the mobile base, the intake assembly including a gathering conveyor configured to move material in a laterally inward direction toward a center of the intake assembly; and a vacuum conduction assembly configured to conduct a vacuum condition from an outlet opening to an inlet opening positioned adjacent to the center of the intake assembly; and a bag take up assembly mounted on the mobile base and configured to store the bag after material has been removed from the bag;

wherein the bag take up assembly comprises a pair of sharpened edges positioned to split the bag in two locations into two longitudinal strips.

18. The attachment of claim 17 additionally comprising a bag take up assembly mounted on the mobile base and configured to store the bag after material has been removed from the bag; and wherein the bag take up assembly comprises a pair of take up spools for each receiving one of the longitudinal strips, each of the take up spools being positioned on a lateral side of the vacuum conduction assembly.

19. The attachment of claim 17 wherein the vacuum conduction assembly comprises a vacuum conduit extending between and in fluid communication with the inlet opening and the outlet opening.

\* \* \* \* \*